US010199713B2

(12) United States Patent
Bailey et al.

(10) Patent No.: US 10,199,713 B2
(45) Date of Patent: Feb. 5, 2019

(54) SYSTEMS, DEVICES, AND METHODS FOR ORIENTING AN ANTENNA MAST

(71) Applicant: DISH Technologies L.L.C., Englewood, CO (US)

(72) Inventors: Matthew Bailey, Centennial, CO (US); William Roberts, Centennial, CO (US)

(73) Assignee: DISH Technologies L.L.C., Englewood, CO (US)

( * ) Notice: Subject to any disclaimer, the term of this patent is extended or adjusted under 35 U.S.C. 154(b) by 549 days.

(21) Appl. No.: 14/711,700

(22) Filed: May 13, 2015

(65) Prior Publication Data
US 2016/0336640 A1    Nov. 17, 2016

(51) Int. Cl.
| *H01Q 1/12* | (2006.01) |
| *F16L 3/205* | (2006.01) |
| *F16L 3/16* | (2006.01) |
| *H01Q 3/06* | (2006.01) |

(52) U.S. Cl.
CPC ............... *H01Q 1/125* (2013.01); *F16L 3/16* (2013.01); *F16L 3/2053* (2013.01); *H01Q 3/06* (2013.01)

(58) Field of Classification Search
CPC ... H01Q 1/125; H01Q 3/06; F16L 3/16; F16L 3/2053; F16M 11/36; F16M 13/022; F16M 13/02; F16M 11/2007; F16M 11/10; F16M 11/2014; F16M 11/2021; Y10S 248/904; Y10S 248/916; Y10S 248/919; A47G 2001/146; A01K 97/10; B65H 75/4463
USPC ........................................................ 343/840
See application file for complete search history.

(56) References Cited

U.S. PATENT DOCUMENTS

| 5,526,010 | A | * | 6/1996 | Plunk | ................... | H01Q 1/1235 |
| | | | | | | 248/910 |
| 5,657,031 | A | * | 8/1997 | Anderson | .............. | H01Q 1/125 |
| | | | | | | 343/757 |
| 5,734,356 | A | * | 3/1998 | Chang | .................... | H01Q 1/125 |
| | | | | | | 343/760 |
| 5,923,288 | A | * | 7/1999 | Pedlow, Jr. | .......... | H01Q 1/1257 |
| | | | | | | 342/359 |
| 5,963,179 | A | * | 10/1999 | Chavez | .................... | H01Q 3/06 |
| | | | | | | 343/765 |
| 6,466,181 | B1 | * | 10/2002 | Ho | ....................... | H01Q 1/1207 |
| | | | | | | 343/765 |
| 7,954,777 | B2 | * | 6/2011 | Bohm | .................... | F16M 11/10 |
| | | | | | | 248/274.1 |

(Continued)

*Primary Examiner* — Jessica Han
*Assistant Examiner* — Bamidele A Jegede
(74) *Attorney, Agent, or Firm* — Seed IP Law Group LLP

(57) ABSTRACT

An antenna mast assembly with an alignment plumb is provided which allows for increased speed and accuracy in aligning antenna masts. The antenna mast assembly includes an antenna mast. An upper end of the mast extends in a first direction and a lower end of the mast extends in a second direction with an angle between the first and second directions. The bend in the mast creates the angle between the upper and lower ends. The upper end of the mast is connected to an antenna. The mast also includes an orientation indicator near its lower end and aligned with the first direction. The mast assembly also includes a foot configured to couple the lower end of the mast to a mounting surface and a plumb coupled to the foot. The plumb includes a plumb indicator that aligns with the mast orientation indicator and indicates that the upper end of the mast is orientated vertically.

19 Claims, 9 Drawing Sheets

(56) References Cited

U.S. PATENT DOCUMENTS

| | | | | |
|---|---|---|---|---|
| 2005/0151692 A1* | 7/2005 | Malhotra | ............. | H01Q 1/1221 |
| | | | | 343/757 |
| 2005/0264467 A1* | 12/2005 | Lin | ........................ | H01Q 1/125 |
| | | | | 343/882 |
| 2006/0225100 A1* | 10/2006 | James | ....................... | H04N 7/20 |
| | | | | 725/63 |
| 2011/0089356 A1* | 4/2011 | Cravener | ................ | F16K 35/10 |
| | | | | 251/231 |
| 2011/0187624 A1* | 8/2011 | Lettkeman | ............... | H01Q 1/12 |
| | | | | 343/882 |
| 2011/0304518 A1* | 12/2011 | Fruh | .................... | H01Q 1/1221 |
| | | | | 343/882 |

\* cited by examiner ns: SYSTEMS, DEVICES, AND METHODS FOR ORIENTING AN ANTENNA MAST

BACKGROUND

Technical Field

The present disclosure generally relates to antenna assemblies and methods for installing and aligning antenna assemblies.

Description of the Related Art

Radio antennas, and in particular directional radio antennas such as satellite dish antennas, are oriented and positioned for optimal reception and transmission of radio signals. Satellite dishes are often installed on a mast. The mast may be oriented vertically with respect to the ground. A satellite dish mast, in particular those used in residential installations, for example, those used in Ku band direct-broadcast satellite television systems, include a bent mast with a satellite dish attached to one end of the mast and a mounting foot attached to the other end. During installation an installer may orient the top of the mast so that it is vertical with respect to the ground. Vertically aligning the top of the mast makes installing and aligning an antenna easier.

An installer uses various tools, such as a bubble level or other device, at the top of the mast to verify its correct orientation while fixing the foot of the mast to a building or other structure. The top and bottom of the mast may be separated by several feet and difficulty in assuring proper orientation of the top of the mast while attaching the foot of the mast to a structure has caused many installers to simply use their eyes to estimate the correct orientation of the antenna while attaching the foot to the structure, rather than use a level. Eyeballing the mast orientation can result in poorly orientated masts and in added difficulty in attaching and aligning antennas and even poorly aligned antennas.

Aligning an antenna mounted on a non-aligned mast is more time consuming than aligning an antenna mounted on an aligned mast. This extra time results an installer installing fewer installations each day. Poorly aligned antennas are also more susceptible to signal degradation and loss and can result in decreased customer satisfaction.

BRIEF SUMMARY

According to principles of the embodiments as disclosed herein, an antenna mast assembly with an alignment plumb is provided which allows for increased speed and accuracy in aligning antenna masts, in particular, mast assemblies that have bent or angled masts. The antenna mast assembly includes a mast. An upper end of the mast extends in a first direction and a lower end of the mast extends in a second direction with an angle between the first and second directions. The bend in the mast creates the angle between the upper and lower ends. The upper end of the mast is connected to an antenna. The mast also includes an orientation indicator near its lower end.

The mast assembly also includes a foot connected to the lower end of the mast. The foot is configured to couple the lower end of the mast to a mounting surface, such as a roof, wall, or post. A plumb is coupled to the foot. The plumb hangs freely such that its center of gravity line is vertical. The plumb includes a plumb indicator. The plumb indicator aligns with the mast orientation indicator and indicates that the second end and the second direction are orientated vertically.

By using a plumb indicator on the mast assembly, an installer may quickly and easily install and align the mast in preparation for installing an antenna on the mast. This mast assembly also increases the ease with which an installer may accurately align the mast and the subsequent alignment of an antenna attached to the mast.

One method of quickly and easily installing such a mast assembly includes coupling a mast to a foot. A lower end of the mast extends in a first direction and an upper end of the mast extends in a second direction with a first angle between the first direction and the second direction. The method also includes aligning the upper end of the mast in a vertical orientation by orienting the foot on a mounting surface and aligning a plumb coupled to the foot with a mast orientation indicator located near the lower end of the mast.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale and some of these elements are enlarged and positioned to improve drawing legibility and understanding of the features.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with antenna masts, satellite communication receiving systems, and methods of their orientation have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is, as "including, but not limited to."

References throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not limit the scope or meaning of the embodiments.

Figure 1:
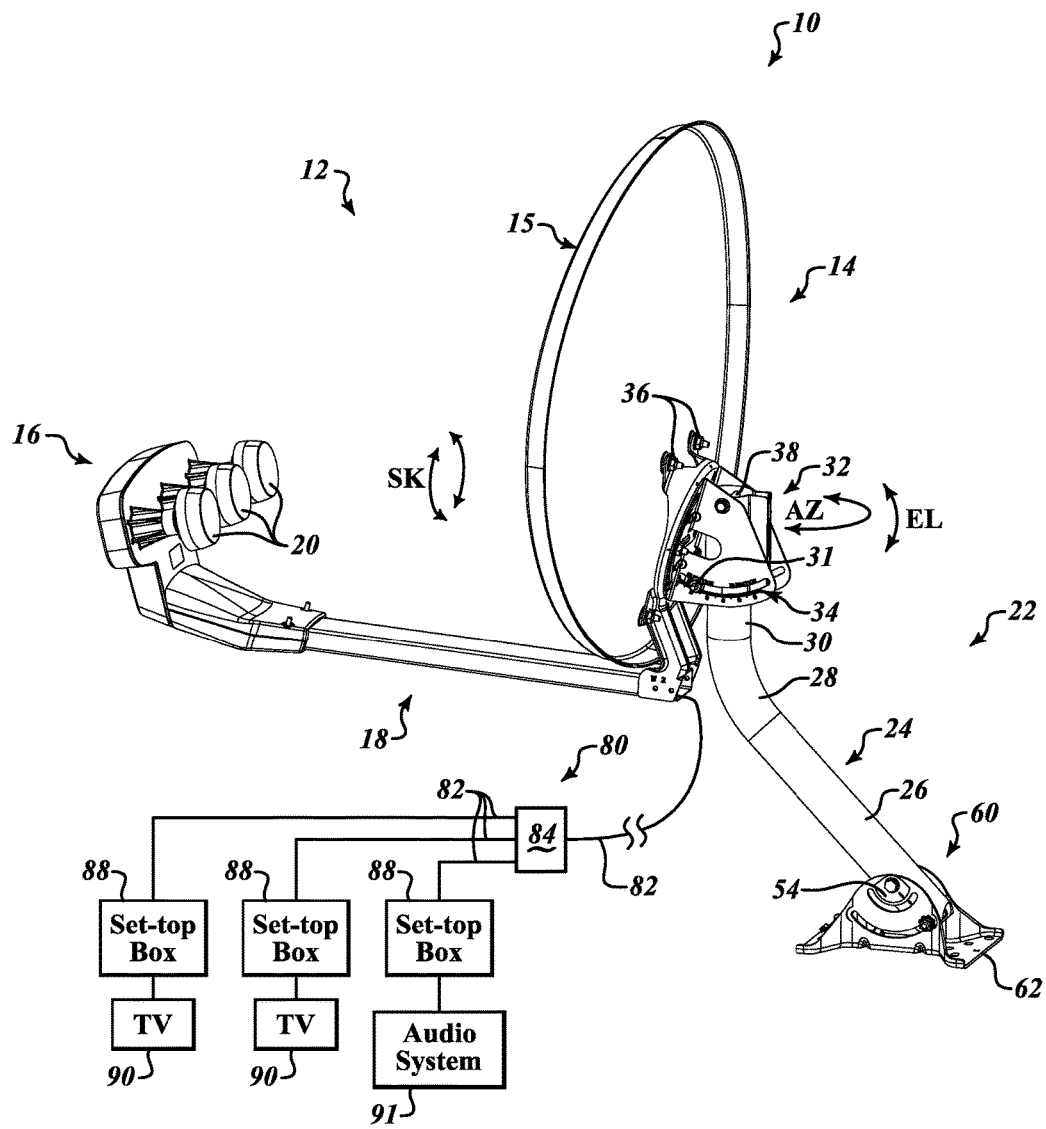
FIG. 1 is perspective view of a satellite communication receiving system according to one embodiment of the present disclosure.

FIG. 1 is diagram of a communication receiving system 10. In one embodiment, the communication receiving system 10 is a satellite communication receiving system. The communication receiving system 10 includes an antenna assembly 12 coupled to a mast assembly 22. The communication receiving system 10 may also include a distribution system 80.

The antenna assembly 12 includes a dish 14 and a receiving system 16. The dish 14 receives radio communication signals, for example, as transmitted from a satellite, and reflects the radio communication signals to the receiving system 16. A reflecting surface 15 of the dish 14 has a shape that focuses the radio signals onto one or more receivers 20 of the receiving system 16. In some embodiments, the reflecting surface 15 may have a sub-spherical or parabolic shape with a focus point located at a receiver 20. In some embodiments the reflecting surface may have more than one focus point, for example, the dish 14 of FIG. 1 focuses the radio signal from each of three different satellites onto one of three receivers 20. Such an antenna assembly allows for the simultaneous reception of signals from, for example, several geostationary satellites, one satellite located at each of 110° W, 119° W, and 129° W geostationary positions.

The receivers 20 are coupled to the dish via an arm 18 that may couple to and extend from the dish 14. The receivers 20 receive the radio signals that are reflected by the dish 14 and transmit the signals or information contained in the signals to a distribution system 80 and to a set-top box, television, and/or audio system. The receivers 20 may be low-noise block downconverters (LNBs) that receive the radio signal reflected from the dish 14, amplify the signal, downconvert the signal to a frequency suitable for transmission over coaxial cables 82, and send the signal to the distribution system 80.

The distribution system 80 may include a switch 84 that distributes the signals received from the receivers 20 to one or more set-top boxes 88, televisions 90, and audio systems 91. The set-top boxes 88, televisions 90, and audio systems 91 may include hardware and software for decoding the radio signals and displaying the images and emitting the sounds transmitted within the radio signals.

The antenna assembly 12 is coupled to an antenna mast assembly 22. The antenna mast assembly 22 includes a foot assembly 60, a mast 24, and a coupling assembly 32. The foot assembly 60 attaches to a lower end 26 of the mast 24 and to a mounting surface 70, see FIG. 3. The mounting surface 70 may be a surface of a wall, roof, post, tree, or other structure suitable for mounting an antenna. The second end 30 of the mast 24 is coupled to the dish 14 via the coupling assembly 32 and couplers 36. The mast 24 has a bend 28 between the lower end 26 and the upper end 30.

The foot assembly 60 is adjustable to allow for installing the mast 24 to mounting surfaces 70 at various inclinations while still being able to orient the upper end 30 of the mast 24 in a vertical orientation, as will be discussed later. The coupling assembly 32 provides adjustability for installing and orientating the dish 14. For example, the coupling assembly 32 includes an elevation indicator 34, an elevation fixing connector 31, such as a bolt, and a pivot 38. To set the dish 14 at the correct elevation, an installer may consult a reference table or otherwise look up the elevation of the satellite relative to the location (e.g., latitude and longitude or postal code) of the antenna. The installer can then rotate the coupling assembly 32 and dish 14 about the pivot 38 until the elevation indicator 34 indicates that the dish 14 is pointed at the correct elevation.

If the upper end 30 of the mast 24 is not exactly vertical, then proper orientation of the dish 14 is more difficult because adjustment of the dish 14 in one direction or about one axis causes a change in the orientation of the dish 14 in another direction or about another axis. For example, when the mast is not vertical, a change in azimuth also causes a change in elevation, and vice versa.

Properly installing a communication receiving system 10 includes orientating the dish 14 such that the reflecting surface 15 is pointed at the appropriate satellite or satellites and can reflect the radio signals from the satellite or satellites to the appropriate receiver 20. The dish 14 of the communication receiving system 10 may be adjustable in three directions (and rotatable about three axes). The dish may be rotatable in Elevation, denoted by EL, Azimuth, denoted by AZ, and Skew, denoted by SK. In a preferred installation, the upper end 30 of the mast 24 is plumb or otherwise in a vertical orientation. In such an installation rotation in azimuth is about an axis that is vertical to the earth and may be measured in degrees according to a compass direction, such as 0 degrees being North, 90 degrees being East, and so on. Rotation in elevation is about an axis that is perpendicular to the vertical direction and points the dish 14 up and down relative to the horizon and may be measured in degrees above or below the horizon. For example, 0 degrees may be parallel to the horizon while 90 degrees may be pointing straight up. Rotation in skew may be rotation about an optical axis of the dish 14. As shown in FIG. 1, rotation in skew is rotation about an approximately horizontal axis approximately in the plane of the page.

A dish 14 designed to receive a radio signal from a single satellite usually does not need to rotate in skew because adjustment in elevation and azimuth will point the dish 14 at the single satellite, but a dish for receiving signals from multiple satellites in geostationary orbit and having angular separation from each other may need to be able to rotate in skew as well. To receive signals from each of these satellites with a single dish, the dish may have multiple focus points along a line in the dish 14. Simply aligning the dish 14 in the correct azimuth and elevation orientations may not fully align the dish 14 with multiple satellites, for example, if the dish 14 is not set at the proper skew angle, the dish 14 may be oriented to receive and reflect signals from one satellite, but not others. Rotating the dish 14 to adjust the skew aids in aligning the line of focus points of the dish 14 with the line of the satellites in geostationary orbit in space.

Proper installation of the mast 24 in a substantially vertical orientation, namely sufficiently close to vertical to permit alignment in a practical amount of time, can be difficult, even to a well trained and experienced installer. One difficulty in orientating the mast 24 is that the installer measures the orientation of the upper end 30 of the mast 24 while attaching the foot assembly 60 to the mounting surface 70 and adjusting the orientation of the mast 24 relative to the foot assembly 60. In other words, the installer is trying to measure the vertical orientation of the upper end 30 of the mast 24 while simultaneously adjusting the foot assembly 60. The awkwardness of such a process often results in installers simply eyeballing the orientation of the upper end 30 of the mast 24 while fixing the foot assembly 60 to the mounting surface 70 and fixing the orientation of the mast 24.

Installers also use additional tools, such as a bubble level, to aid in orienting the upper end 30 of the mast 24. Installers often struggle with reading the bubble level at the upper end 30 of the mast 24 while adjusting the foot assembly 60. The use of additional tools adds time to the installation process and is a potential point of failure. For example, if an installer arrives at an installation location without a level, they either have to go back and get a level or eyeball the installation and orientation of the mast 24.

Figure 2:
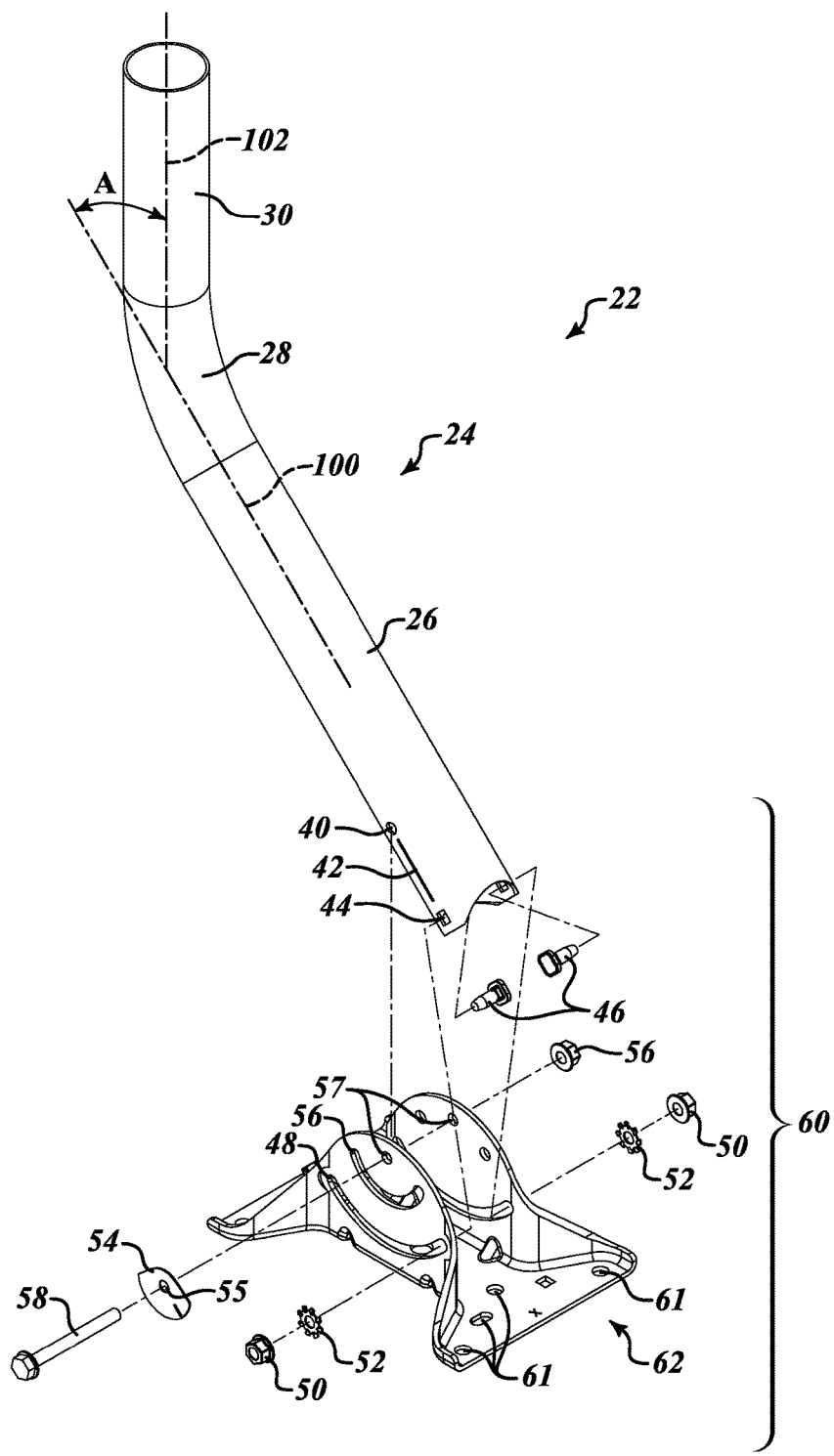
FIG. 2 is an exploded view of a mast assembly according to one or more embodiments of the present disclosure.
Figure 3:
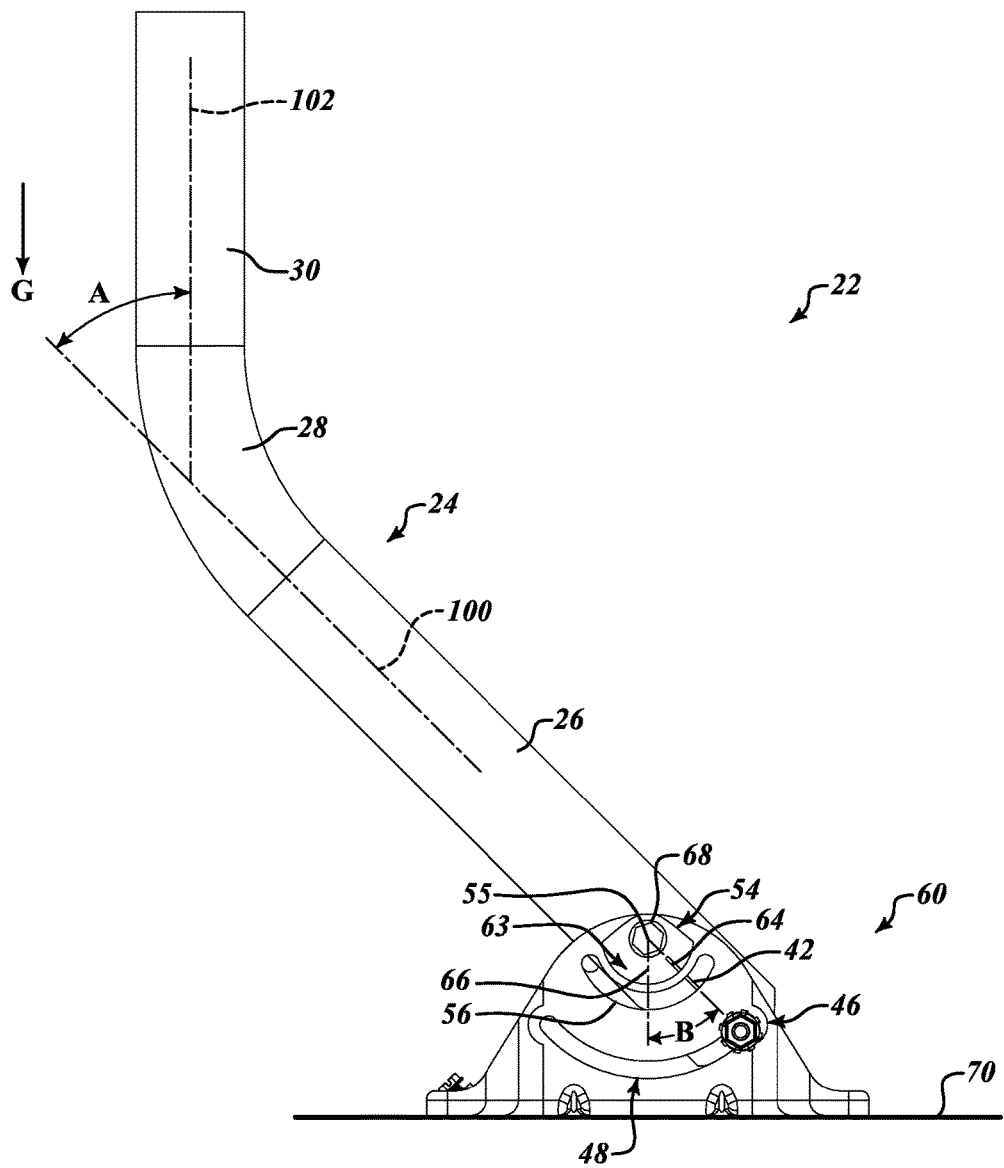
FIG. 3 is side view of a mast assembly according one or more embodiments of the present disclosure.

FIGS. 2 and 3 show a more detailed exploded and side view of the inventive antenna mast assembly 22. As discussed above, the antenna mast assembly 22 includes a mast 24 and a foot assembly 60. The foot assembly 60 attaches to a first end 26 of the mast 24 and to a mounting surface 70. The second end 30 of the mast 24 is coupled to the dish 14 via the coupling assembly 32 and couplers 36, see FIG. 1. The mast 24 has a bend 28 between the lower end 26 and the upper end 30. The lower end 26 of the mast 24 has a centerline 100 that extends in a first direction. The upper end 30 of the mast 24 has a centerline 102 that extends in a second direction. The mast 24 has a bend 28 between the lower end 26 and the upper end 30. The bend 28 has a bend angle A between the centerline 100 of the lower end 26 and the centerline 102 of the upper end 30.

A pivot 58, which may be a fastener such as a bolt, in cooperation with a nut 56, pivotably couples the lower end 26 of the mast 24 to the foot 62 via a mast pivot aperture 40 and a foot pivot aperture 57. The pivot aperture 40 and the foot pivot aperture 57 pivot about the same axis. A clamping coupler 46, which may also be a fastener, such as a bolt, in cooperation with an aperture 44 in the lower end 26 of the mast 24, a lock washer 52, a nut 50, and a mast locking slot 48 aid in adjusting and fixing the angle of the mast 24 with respect to the foot 62. The mast locking slot 48 may have the shape of an arc with a center that coincides with the center of the foot pivot aperture 57.

An installer adjusts the orientation of the mast 24 with respect to the foot 62 by loosening nut 50 such that the clamping coupler 46 is slidingly engaged with the mast locking slot 48. The orientation of the mast 24 can then be adjusted until the upper end 30 of the mast 24 or the centerline 102 is plumb is vertical with respect to the earth. Once the upper end 30 of the mast 24 or the centerline 102 is plumb the nut 50 is tightened such that the clamping coupler 46 securely fixes the relative orientation of the mast 24 with respect to the foot 62. In some embodiments, the antenna mast assembly includes a single clamping coupler 46 or two or more clamping couplers 46.

As described earlier, the foot 62 is coupled to a mounting surface 70, such as the surface of a roof, wall, or post. To orient and properly install the foot 62, an installer may first pivotably couple the foot 62 to the mounting surface 70 via single fastener, such as a bolt or screw, through one of the apertures 61. The installer can then rotate the foot about the aperture 61 until the pivot axis of the mast 24 and the foot 62 (for example, an axis between the center of the foot pivot apertures 57) is in a plane perpendicular to the vertical axis (or tangential to the surface of the earth at the installation location of the communication receiving system 10). Once the pivot axis is properly oriented, the installer can couple the foot 62 to the mounting surface 70 via a second fastener, or more fasteners and apertures 61, thereby fixing the orientation of the foot 62.

The orientation of the mast 24 may also be fixed relative to the foot 62 and such that the top end of the mast 24 or the centerline 102 is vertical with respect to the earth. As described above, the top end 30 of the mast 24 should be vertical to facilitate orientation of the dish 14 and proper orientation of the mast 24 is difficult because of an installer's attempts to focus on both ends of the mast 24 while fixing its orientation.

Figure 5:
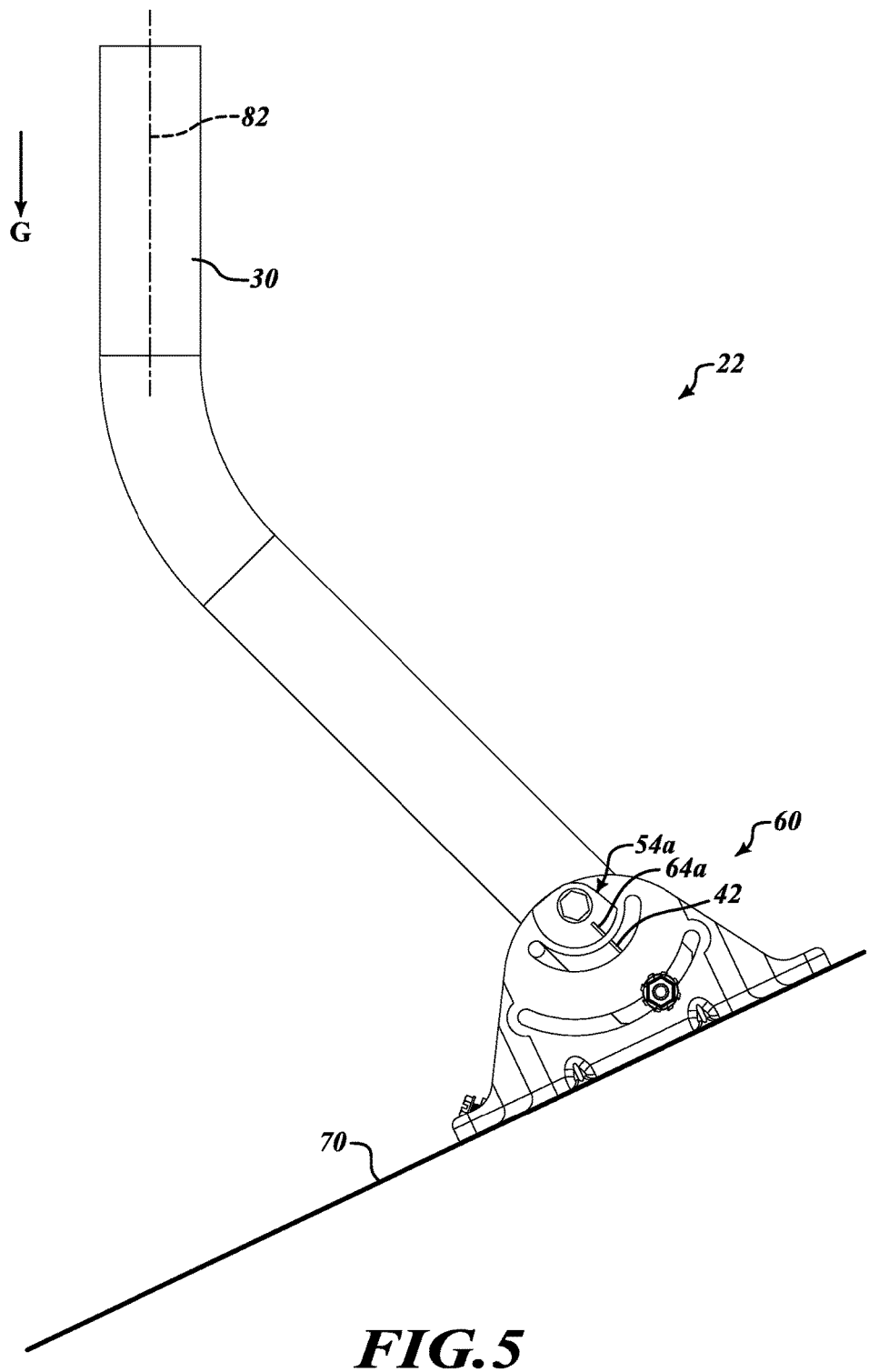
FIG. 5 is side view of a mast assembly according to one or more embodiments of the present disclosure.
Figure 8A:
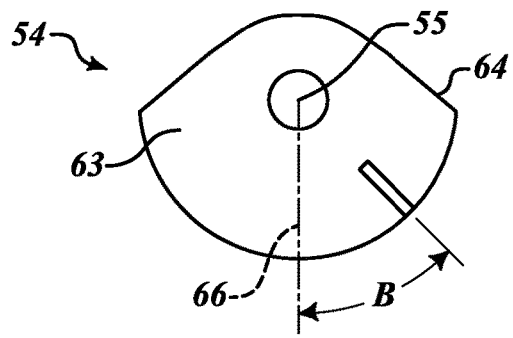
FIGS. 8A-8F show views of several embodiments of plumbs according to one or more embodiments of the present invention.

The mast assembly 22 includes a plumb 54. A more detailed depiction of plumb 54 is shown in FIG. 8A. The plumb 54 has a center of gravity that is offset from the center of the plumb's aperture 55. In some embodiments, the center of gravity of the plumb 54 is offset from the axis about which the mast 24 rotates relative to the foot 62. The offset center of gravity of the plumb 54 allows the plumb 54 to hang vertically, independent of the angle of the foot 62. For example, foot 62 may be mounted on a horizontal mounting surface 70, as shown in FIG. 3, or may be mounted on a sloped mounting surface, as shown in FIG. 5, but the offset center of gravity of the plumb 54 still causes the plumb to hang vertically, such that a center of gravity line 66 is formed between the center of the aperture 55 of the plumb 54 and the center of gravity of the plumb is vertical.

The plumb 54 also includes a vertical alignment indicator 64. For example, the vertical alignment indicator 64 of the plumb 54 may be an edge of the weighted portion 63 of the plumb 54, a marking on the surface of the plumb 54, or a line or channel scored, pressed, or otherwise formed into the surface of the plumb 54. A line is the alignment indicator 64 in this embodiment that forms an angle B with the center of gravity line 66 of the plumb 54. As shown in FIG. 3, angle B is set to equal or the angle A. The plumb 54, and in particular the alignment indicator 64, aids in orientating the mast 24.

The mast 24 also includes an alignment aid. For example, the lower end 26 of the mast 24 includes a mast alignment indicator 42. The mast alignment indicator 42 is parallel to the centerline 100 of the lower end 26 of the mast 24. The mast alignment indicator 42 is also aligned with the center of the mast pivot aperture 40 such that, if extended it would extend through the center of the mast pivot aperture 40. Using the plumb 54, an installer vertically orients the upper end 30 of the mast 24 by aligning the vertical alignment indicator 64 of the plumb 54 with the mast alignment indicator 42 of the mast 24.

Figure 6:
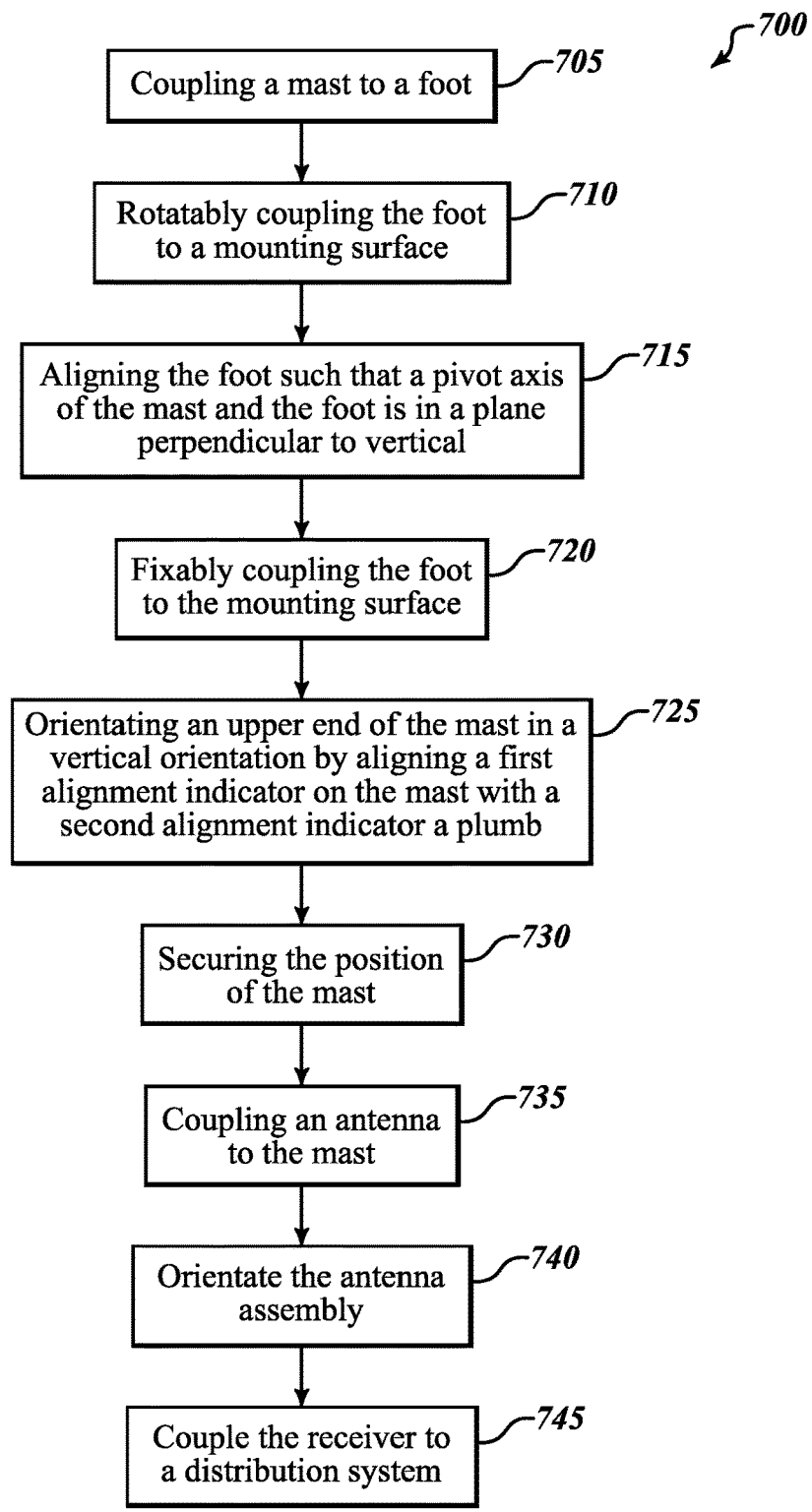
FIG. 6 is block diagram of a method for orientating an antenna mast according to one or more embodiments of the present disclosure.

FIG. 6 shows a method of installing a communication receiving system 700, such as the communication receiving system 10. The method includes orienting a mast, such as mast 24, and an antenna, such as the dish 14.

At block 705 a mast, such as mast 24, is coupled to a foot, such as foot 62. The mast 24 may be pivotably coupled to the foot 62 by inserting a foot pivot 58, such as a bolt or pin, through respective foot pivot apertures 57 and mast pivot apertures 40 and securing the pivot 58 with a nut 56. Coupling the foot 62 to the mast 24 may also include coupling a plumb, such as plumb 54, to the foot 62 and/or the mast 24 via, for example, the foot pivot 58.

At block 710 the foot 62 is rotatably coupled to a mounting surface, such as mounting surface 70, which may be a surface of roof, wall, fence, post, tree or other object. Rotatably coupling the foot 62 to the mounting surface 70 may include attaching the foot 62 to the mounting surface 70 via a single fastener, such as a bolt or screw.

At block 715, the foot is aligned such that the pivot axis of the mast and the foot is in a plane perpendicular to vertical. For example, an installer may rotate the foot 62 until the pivot axis of the mast 24 and the foot 62 (for example, an axis between the center of the foot pivot apertures 57) is in a plane perpendicular to the vertical axis (or tangential to the surface of the earth at the installation location of the communication receiving system 10).

At block 720, the foot is fixedly coupled to the mounting surface 70. Once the pivot axis is properly oriented, the installer may couple the foot 62 to the mounting surface 70 via a second fastener, or more fasteners, thereby fixing the orientation of the foot 62.

At block 725, an upper end 30 of the mast 24 is oriented in a vertical orientation by aligning a first alignment indicator on the mast with a second alignment indicator of the plumb. For example, an installer may vertically orient the upper end 30 of the mast 24 by rotating the mast 24 about the mast pivot aperture 40 until the mast alignment indicator 42 of the mast 24 aligns with the vertical alignment indicator 64 of the plumb 54.

At block 730, the orientation of the mast 24 is fixed. For example, in the embodiment shown in FIGS. 2 and 3, the clamping coupler 46, which may be, for example, one or more bolts with associated nuts 50 and washers 52, may be tightened such that the bolt clamps the mast 24 to the foot 62 through the aperture 44 in the mast 24 and the locking slot 48 in the foot 62.

At block 735, the antenna is coupled to the mast 24. In some embodiments, the antenna may be an antenna assembly, such as antenna assembly 12, which includes a dish 14 and receivers 20, or other type of directional antenna. The antenna may be coupled to the mast 24 via a coupling assembly 32 that couples to the antenna and to the mast 24. The coupling assembly 32 may be adjustable such that by adjusting the coupling assembly 32, for example, as described above with respect to FIG. 1, the dish 14 may be oriented properly.

At block 740, the antenna assembly is oriented. In some embodiments the azimuth and the elevation of the antenna are adjusted such that a dish, such as dish 14, points to a geostationary satellite. In some embodiments, the skew of the dish 14 may also be adjusted such that the dish 14 receives and reflects radio signals from multiple satellites in geostationary orbit to multiple receivers, such as receivers 20. Orienting the antenna assembly may also include attaching the receiving system 16 to the dish 14 and aligning and positioning the receivers at one or more focus points of the dish 14. Orienting the antenna assembly may also include fixing the antenna assembly in a desired orientation, for example, by tightening bolts or other fasteners, such as the elevation fixing connector 31.

At block 745, the receiver is coupled to a distribution system, such as distribution system 80. In some embodiments, coupling the receiver to a distribution system may include coupling the receiver or antenna in electronic communication with the distribution system. In some embodiments, coupling to the distribution system may include coupling a coaxial cable to a splitter 84, which may also be a switch, that may be further coupled to and distributes signals to one or more set-top boxes 88, televisions 90, and audio systems 91.

Figure 4:
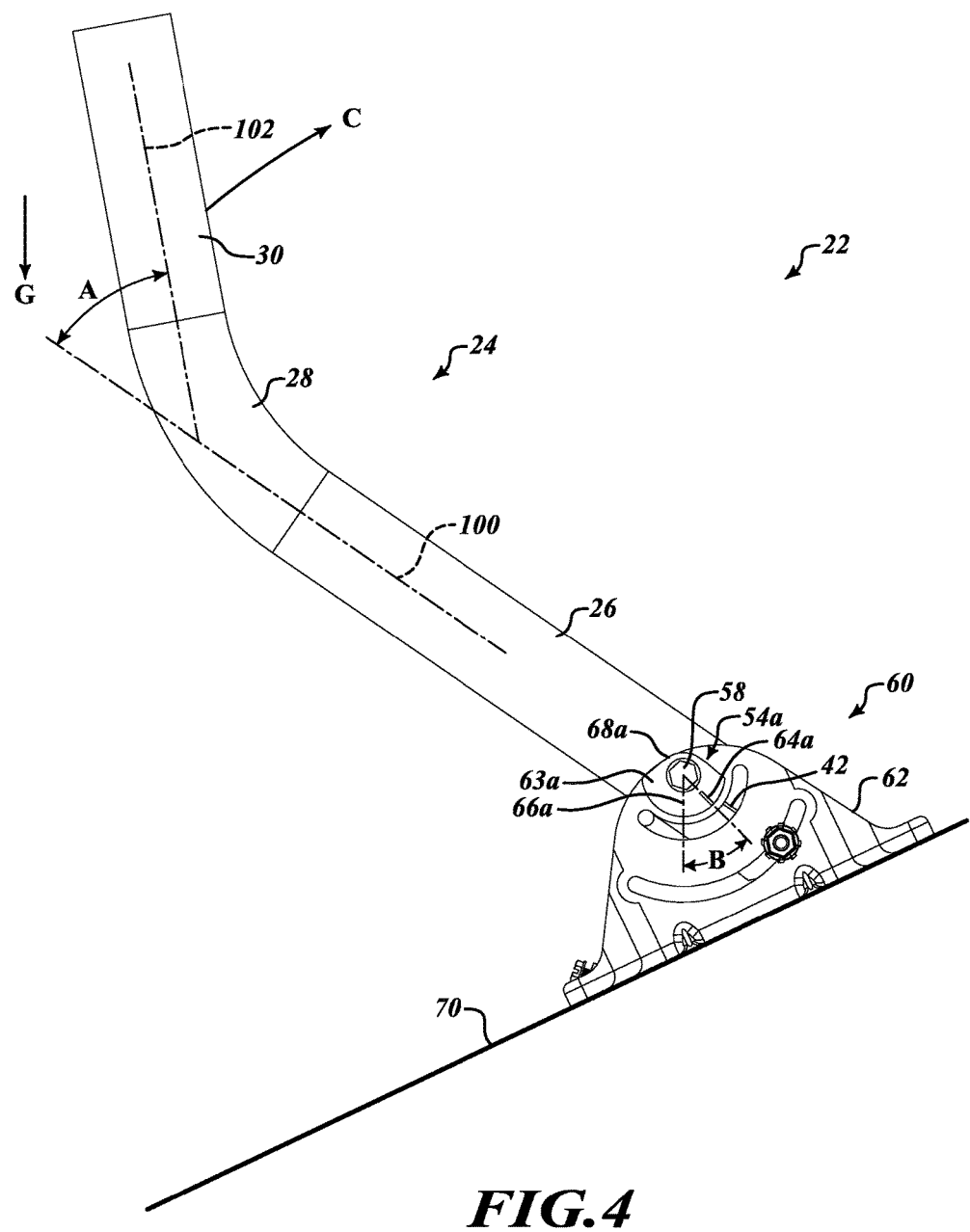
FIG. 4 is side view of a mast assembly according to one or more embodiments of the present disclosure.

FIG. 4 depicts a mast assembly 22 mounted to an inclined mounting surface 70. In addition, the mast assembly 22 is shown in an improperly aligned configuration. For example, one can observe that centerline 102 of the upper end 30 of the mast 24 is not in a vertical orientation (indicated in FIG. 4 by the arrow G). In this orientation, the alignment indicator 64 of the plumb 54 does not align with the mast alignment indicator 42. To properly orient the mast 24, the mast 24 should be rotated about the pivot 58 in a clockwise direction, as indicated by the arrow C.

FIG. 5 shows the mast assembly 22 after rotation of the mast 24 as indicated by the arrow C in FIG. 4 until the alignment indicator 64 of the plumb 54 aligns with the mast alignment indicator 42.

The plumb 54 is suspended in a pivotable manner such that it hangs free and is allowed to rotate. By hanging free, the center of gravity line 66 is always vertical. In some embodiments, the plumb 54 is suspended directly from the pivot 58. In such embodiments, the pivot 58 and nut 56 are secured without undue clamping of the plumb 54 between the head of the pivot 58 and the wall of the foot 62. In some embodiments, the pivot 58 or plumb 54 includes a press fit bearing on which the plumb 54 rotates.

Figure 7:
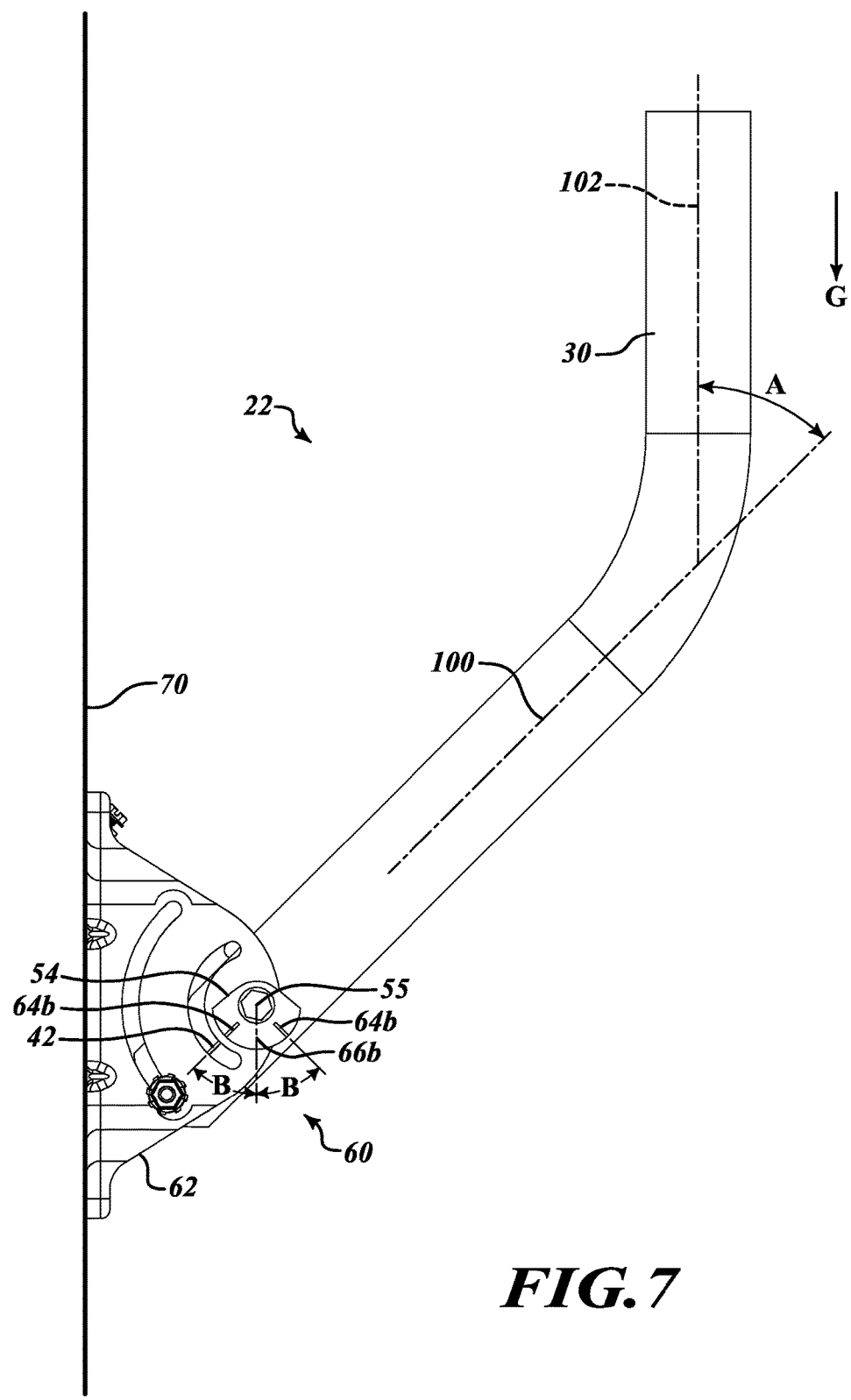
FIG. 7 is side view of a mast assembly according to one embodiment of the present disclosure.

FIG. 7 depicts an embodiment of a mast assembly 22 mounted to a vertical mounting surface 70. As shown in FIGS. 7 and 8F, the plumb 54b includes two alignment indicators 64b. The angle B between each of the alignment indicators 64b and the center of gravity line 66b of the plumb 54b is equal to the angle A formed between the centerline 100 of the lower end of the mast 24 and the centerline 102 of the upper end 30 of the mast 24. The two alignment indicators 64b on the plumb 54b allow an installer to mount the foot 62 to a mounting surface 70 with either end of the foot 62 above the other end. For example, the foot 62 may be rotated 180 degrees and the plumb 54a and one of its alignment indicators still aligns with the mast alignment indicator 42 to indicate a proper vertical orientation of the mast 24.

FIGS. 8A through 8F show embodiments of plumbs 54. FIG. 8A shows an embodiment of a plumb 54 as described earlier in reference to FIGS. 1 through 5.

Figure 8B:
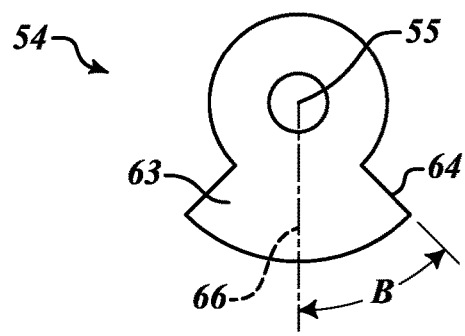

FIG. 8B shows an embodiment of a plumb 54 wherein the alignment indicator 64 is an edge of the plumb 54. In particular, the alignment indicator 64 shown in FIG. 8B is the edge of the weighted portion 63 of the plumb 54. Thus, aligning a mast assembly 22 that includes a plumb 54 with a edge as an alignment indicator, the installer would align the edge, in this case the alignment indicator 64, with the mast alignment indicator 42.

Figure 8C:
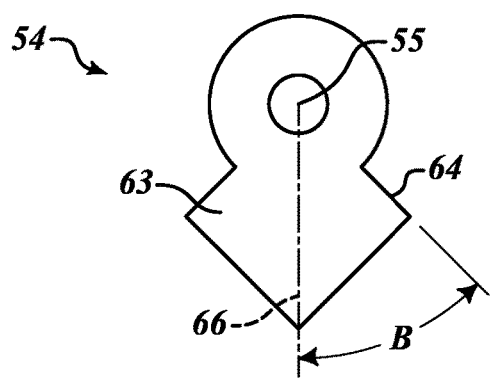

FIG. 8C shows an embodiment of a plumb 54 with an extended weighted portion 63. The extended weighted portion 63 has a diamond shape which shifts the center of gravity further away from the pivot point 55. By shifting the center of gravity further away from the pivot point, the force of gravity action on the plumb 54 when it is out of alignment acts as a lever on the plumb increases the ability of the plumb to resist friction and return to a vertical orientation.

Figure 8D:
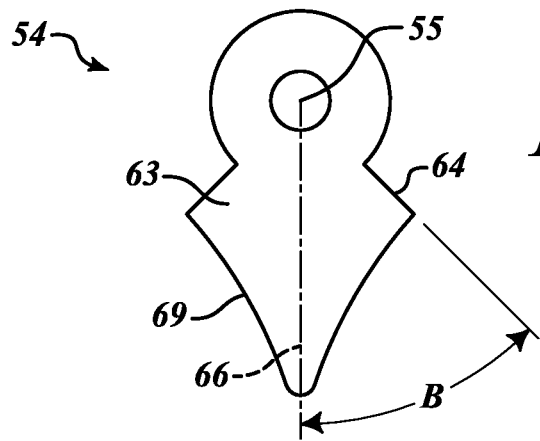

Like FIG. 8C, FIG. 8D also shows an embodiment of a plumb 54 with an extended weighted portion 63. The extended weighted portion 63 has an extension 69 that shifts the center of gravity even further away from the pivot point 55 as compared to the pivot shown in FIG. 8C.

Figure 8E:
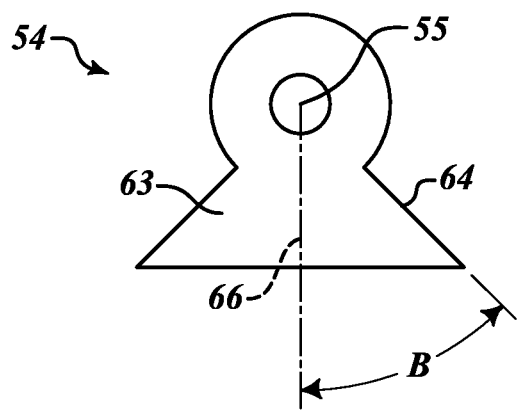
Figure 8F:
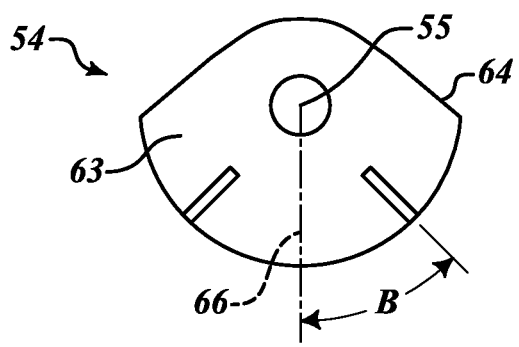

FIG. 8E shows an embodiment of a plumb 54 with a weighted portion 63 that has a triangular shape.

Although the pivots 54 depicted in FIGS. 8C through 8E have alignment indicators 64 that are edges, in some embodiments, the pivots 54 may include alignment indicators 64 that are markings on the surface of the plumb 54, or a line or channel scored, pressed, or otherwise formed into the surface of the plumb 54.

The pivots 54 depicted in FIGS. 8A though 8F are shown as examples of the many shapes that pivots 54 may have and do not limit the possible variations of pivots 54 that are within the scope of this disclosure.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An antenna mast assembly comprising:
a mast having a first end and a second end opposite the first end, the first end extending in a first direction and the second end extending in a second direction with a first angle therebetween, and the second end configured to receive an antenna;
a first centerline along which the first end of the mast extends;
a mast orientation indicator on the mast and proximate the first end of the mast, extending parallel to the first centerline;
a foot connected to the first end of the mast and configured to be connected to a mounting surface;
a plumb having an aperture with a center about which it is able to rotate and a center of gravity that is spaced from the center of the aperture, the plumb being coupled to the foot at the plumb aperture and having a plumb indicator configured to align with the mast orientation indicator and indicate that the second end and the second direction are orientated in a substantially vertical direction.

2. The antenna mast assembly of claim 1, further comprising:
a second centerline along which the second end of the mast extends;
the first angle of the mast being the angular separation between the first centerline and the second centerline;
a second angle formed between a center of gravity line of the plumb and the plumb indicator, the second angle being equal to the first angle.

3. The antenna mast assembly of claim 2, wherein the plumb includes a weighted portion that extends from a perimeter of the plumb.

4. The antenna mast assembly of claim 2, wherein the plumb indicator is an edge of the plumb.

5. The antenna mast assembly of claim 1, wherein the plumb indicator is formed on the surface of the plumb.

6. A satellite communication receiving system comprising:
an antenna mast assembly including:
a mast having a first end and a second end opposite the first end, the first end extending in a first direction and the second end extending in a second direction with a first angle therebetween, and the second end configured to receive an antenna;
a first centerline along which the first end of the mast extends;
a mast orientation indicator on the mast and proximate the first end of the mast, extending parallel to the first centerline;
a foot coupled the first end of the mast and configured to be connected to a mounting surface;
a plumb having an aperture with a center about which it is able to rotate and a center of gravity that is spaced from the center of the aperture, the plumb being coupled to the foot and having a plumb indicator configured to align with the mast orientation indicator and indicate that the second end and the second direction are orientated vertically;
an antenna coupled to the antenna mast assembly and electrically coupled to a television.

7. The satellite communication receiving system of claim 6, further comprising:
a second centerline along which the second end of the mast extends;
the first angle of the mast being the angular separation between the first centerline and the second centerline;
a second angle formed between a center of gravity line and the plumb indicator, the second angle being equal to the first angle.

8. The satellite communication receiving system of claim 7, wherein the plumb includes a weighted portion that extends from a perimeter of the plumb.

9. The satellite communication receiving system of claim 8, wherein the plumb indicator is an edge of the weighted portion of the plumb.

10. The satellite communication receiving system of claim 6, wherein the plumb indicator is formed on the surface of the plumb.

11. The satellite communication receiving system of claim 6 wherein the antenna includes a satellite dish and a receiver.

12. The satellite communication receiving system of claim 11 further comprising:
a distribution system, the receiver electrically coupled to the distribution system.

13. The satellite communication receiving system of claim 12 wherein the distribution system includes:
a set-top box electrically coupled to the receiver; and
a television electrically coupled to the set-top box.

14. A method of orientating an antenna mast, the method comprising:
coupling a mast to a foot, the mast having a first end and a second end opposite the first end, the first end extending in a first direction and the second end extending in a second direction with a first angle therebetween, the second end configured to receive an antenna, and the mast having a first centerline along which the first end of the mast extends and a mast orientation indicator proximate the first end of the mast, extending parallel to the first centerline; and
aligning the second end of the mast in a vertical orientation by:
orientating the foot on a mounting surface; and
aligning a plumb with the mast orientation indicator, the plumb coupled to the foot and having an aperture with a center about which it is able to rotate and a center of gravity that is spaced from the center of the aperture, wherein the aligning the plumb includes aligning a plumb indicator configured to align with the mast orientation indicator and indicate that the second end and the second direction are orientated vertically with the mast orientation indicator.

15. The method of orientating an antenna mast of claim 14, further comprising:
    securing the mast in the vertical orientation.

16. The method of orientating an antenna mast of claim 14, further comprising:
    coupling an antenna assembly to the mast; and
    aligning the antenna assembly with at least one radio transmitter.

17. The method of orientating an antenna mast of claim 16, wherein the antenna assembly includes a dish, the at least one radio transmitter is a satellite based transmitter, and aligning the antenna assembly with the at least one radio transmitter includes orienting the dish to point the dish at the satellite based transmitter.

18. The method of orientating an antenna mast of claim 16, the method comprising:
    coupling a receiver of the antenna assembly to a distribution system.

19. The method of orientating an antenna mast of claim 16, wherein the distribution system includes a set-top box coupled to a television.

\* \* \* \* \*